Sept. 5, 1961     G. M. SOMMER     2,998,887
TRANSFER MECHANISM
Filed Aug. 14, 1956     6 Sheets-Sheet 1

FIG. I

*INVENTOR:*
GORDON M. SOMMER
BY
Marzall, Johnston, Cook & Root.
ATT'YS

Sept. 5, 1961          G. M. SOMMER                2,998,887
                    TRANSFER MECHANISM
Filed Aug. 14, 1956                          6 Sheets-Sheet 2

INVENTOR:
GORDON M. SOMMER
BY
Marzall, Johnston, Cook & Root.
ATT'YS

Sept. 5, 1961  G. M. SOMMER  2,998,887
TRANSFER MECHANISM
Filed Aug. 14, 1956  6 Sheets-Sheet 3
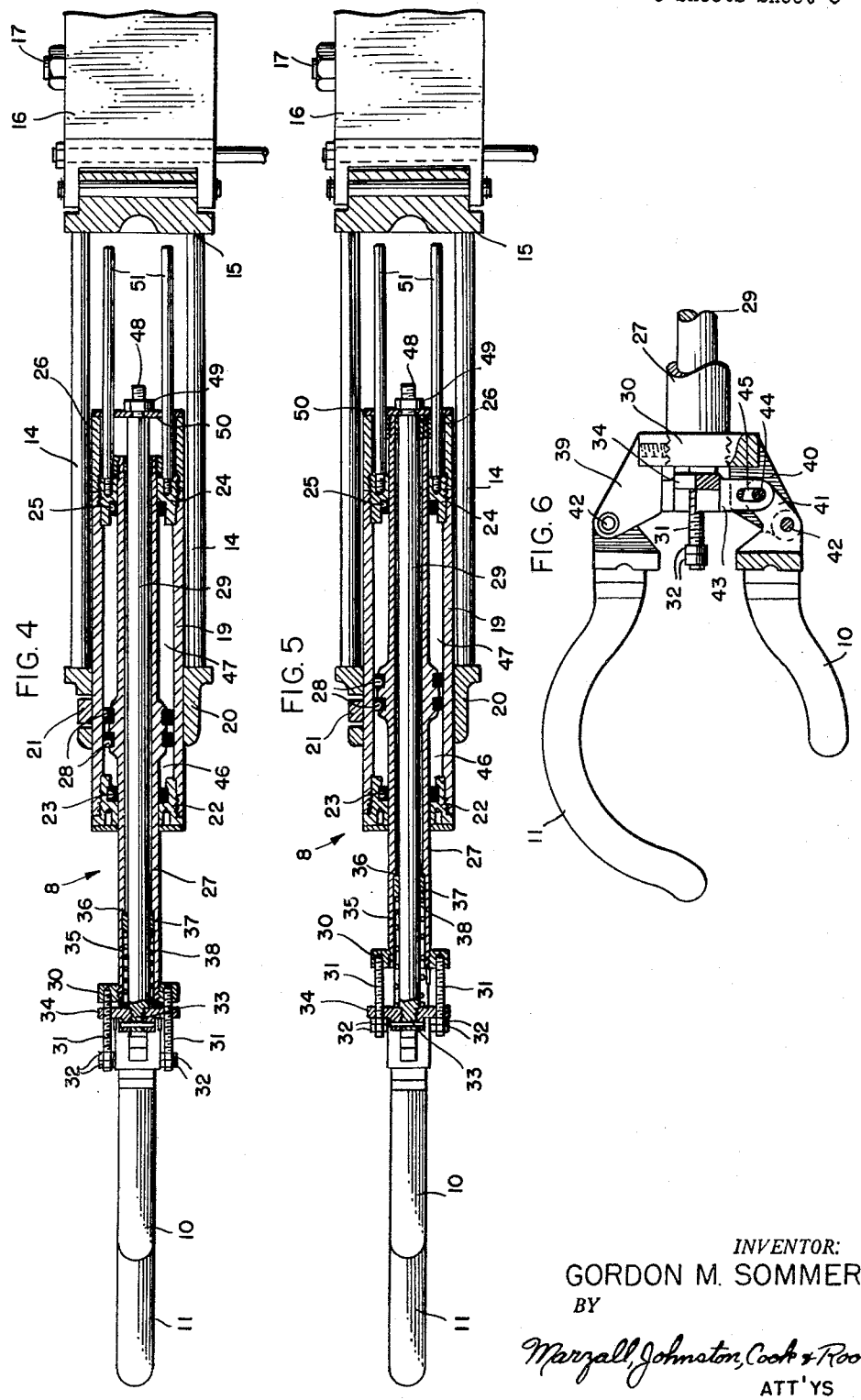
INVENTOR:
GORDON M. SOMMER
BY
Marzall, Johnston, Cook & Root.
ATT'YS

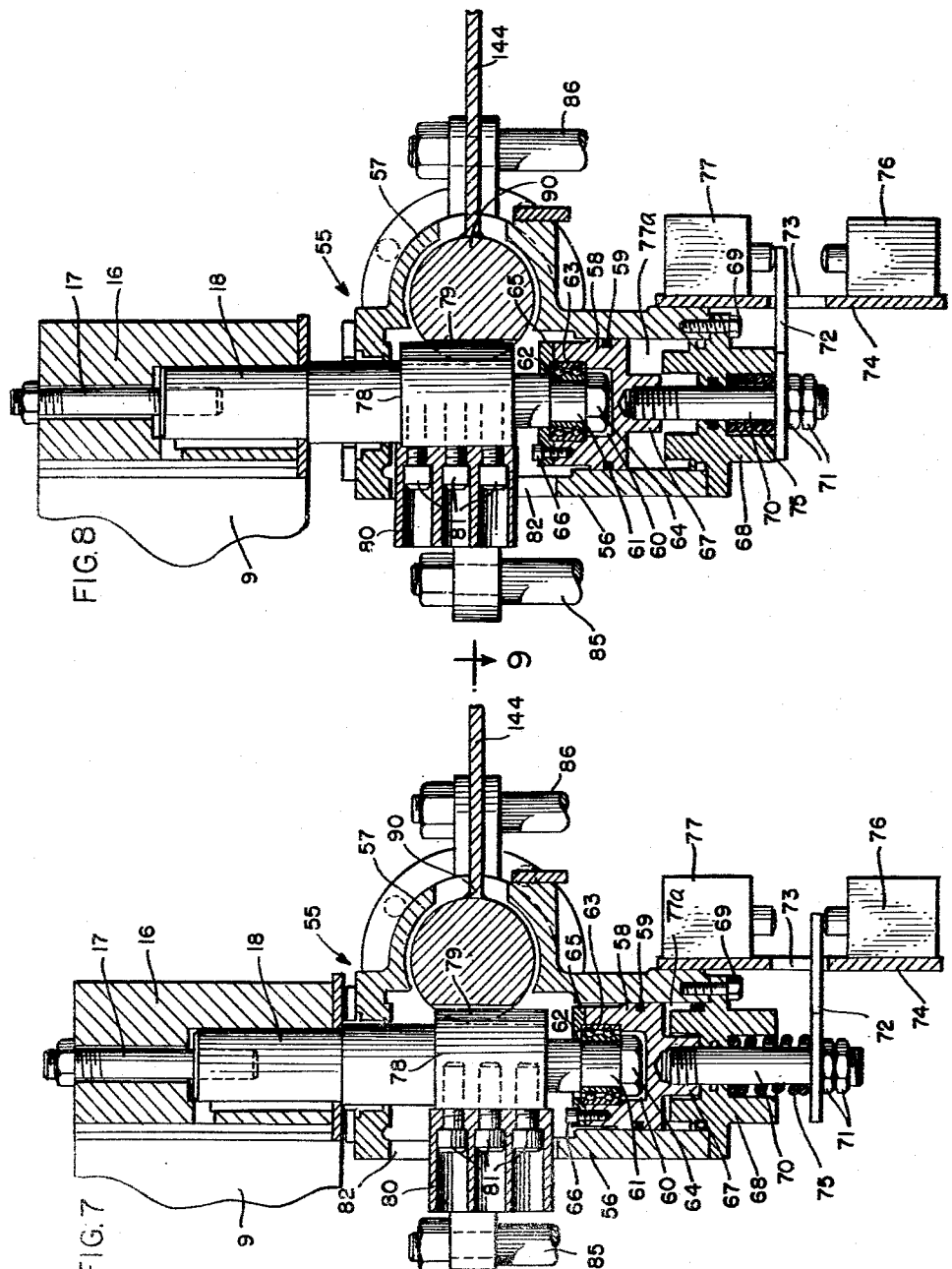

Sept. 5, 1961 G. M. SOMMER 2,998,887
TRANSFER MECHANISM
Filed Aug. 14, 1956 6 Sheets-Sheet 5
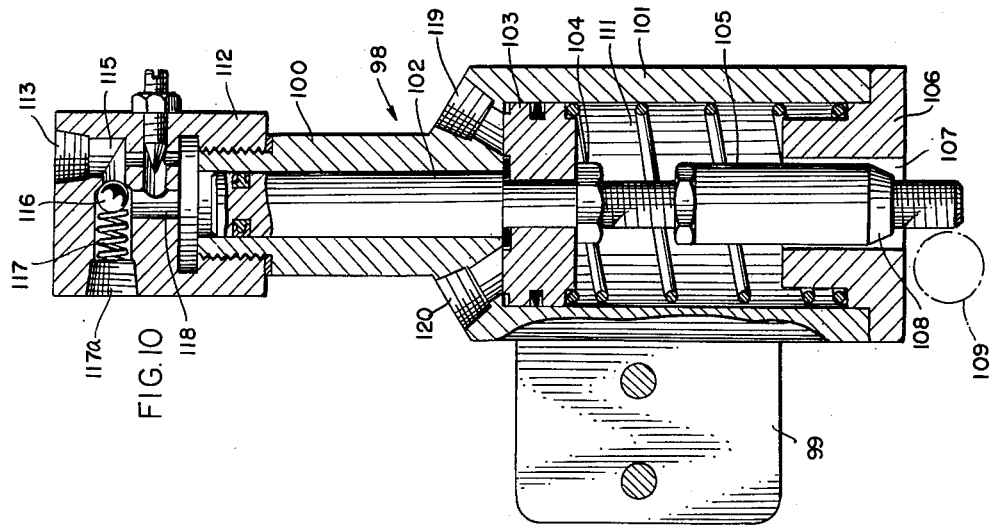
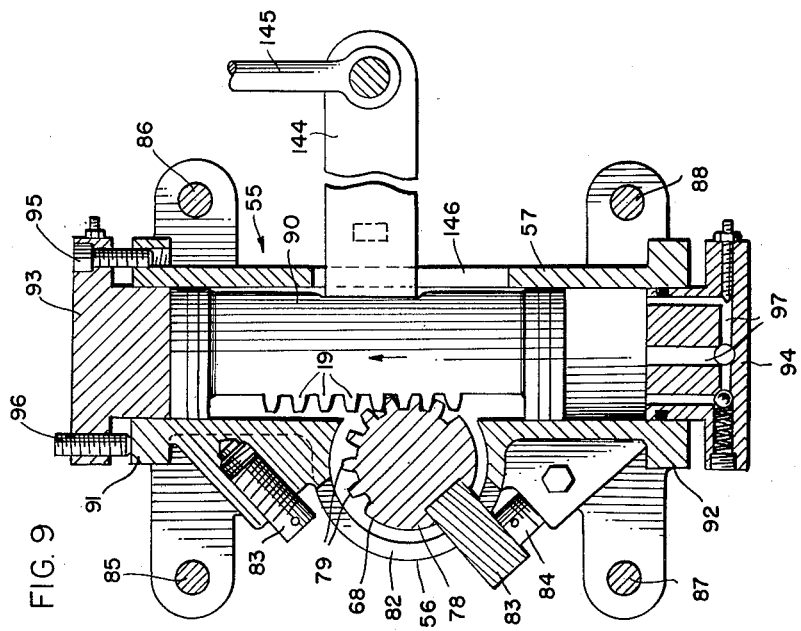
INVENTOR:
GORDON M. SOMMER
BY
Marzall, Johnston, Cook & Root.
ATT'YS Sept. 5, 1961  G. M. SOMMER  2,998,887
TRANSFER MECHANISM
Filed Aug. 14, 1956  6 Sheets-Sheet 6

INVENTOR:
GORDON M. SOMMER
BY
Marzall, Johnston, Cook + Root.
ATT'YS

United States Patent Office 2,998,887
Patented Sept. 5, 1961

2,998,887
TRANSFER MECHANISM
Gordon M. Sommer, Hinsdale, Ill., assignor to U. S. Industries, Inc., New York, N.Y., a corporation of Delaware
Filed Aug. 14, 1956, Ser. No. 603,935
3 Claims. (Cl. 214—1)

This invention relates in general to transfer mechanism and is directed more particularly to a novel form of transfer mechanism for use in transferring objects from one station to another to have an operation performed thereon.

Although the invention is not limited for use in connection with any particular object or workpiece, nor to any particular type of operation or work to be performed thereon, it is shown and described herein for purposes of illustration as used in connection with a metal drawing press and particularly a press of the gap frame or inclinable type.

The invention herein is especially suited for situations where a plurality of successive operations are to be performed on a single workpiece or object. For example, it is not unusual to perform a preliminary stamping operation on a workpiece in one press and then transfer this workpiece to a second press for a second stamping operation. It may even be necessary in certain instances to perform a third or fourth operation on the same workpiece, necessitating a transfer of that piece to a plurality of different presses. In many instances the workpiece must be removed between operations and inspected or have some hand operation performed thereon.

When the removal from each press and the transferring of the workpiece from one press to another is performed by hand, it is obvious that considerable time is consumed in such an operation. Furthermore, it is not unusual to remove a workpiece from a press and store it for some time before a second or third operation is performed thereon. To do this, the so-called "in-process inventory" is needlessly increased.

It is, therefore, a principal object of the present invention to provide a transfer device which is timed to the operation of the presses and which will automatically and mechanically transfer workpieces from one station to another for successive operations to be performed thereon.

A further object of the invention is to provide a transfer mechanism wherein transfer means, including one or more arm members, have pick-up devices thereon which may be operated automatically to pick up a workpiece or an object from one press or station and transfer such object to a successive press or station.

Another object of the invention is to provide a transfer mechanism which includes a plurality of arms each having a pick-up device thereon which operate simultaneously so that one device will pick up an object from a first station while a second device picks up an object from a second station and will then transfer the first object to the second station while the second object is being transferred to a third station.

A further object of the invention is to provide a transfer mechanism wherein one or more arms each having a pick-up device thereon are mounted for longitudinal reciprocating movement and wherein outward movement of the arm will actuate the pick-up device thereon to pick up and retain an object and thereafter upward movement of the arm will actuate indexing means for moving the arm to the next successive station where the object is deposited.

Still another object of the invention is to provide a transfer mechanism wherein a longitudinally movable arm having a pick-up device thereon may be actuated by fluid means to cause said pick-up device to be actuated to pick up and retain an object from one station and thereafter fluid operated elevating means will be actuated to elevate the arm, which movement will then actuate a fluid operated indexing means to rotate the arm to a successive station.

A still further object of the invention is to provide a transfer mechanism which will be operated to cause a release of the object at the successive station to which it has been transferred, whereupon an inward movement of the arm on which the pick-up device is mounted will actuate the fluid operated indexing means to return the arm to its initial position.

Still another and more specific object of the invention is to provide a pick-up device consisting of a pair of jaws mounted on an arm which may be automatically closed to retain an object therein when the arm is moved outwardly and which will open to release an object therefrom when the arm is retracted inwardly.

Still another specific object of the invention is to provide a pick-up device consisting of a vacuum producing means which will cause a vacuum to be produced in a vacuum head mounted on an arm for retaining an object thereon while the arm is moved by indexing means from one station to another.

Other objects and advantages of the invention will become apparent upon reading the following description taken in conjunction with the accompanying drawings, in which FIG. 1 is a plan view of a series of presses shown partly in section and illustrating a plurality of the transfer devices of the present invention disposed between adjacent presses;

FIG. 4 is a further enlarged vertical longitudinal sectional view through one of the arms of the transfer mechanism taken along the plane of line 4—4 of FIG. 2 and showing the arm in its outer or extended position;

FIG. 5 is a view similar to FIG. 4 but showing the arm partially retracted;

FIG. 6 is an enlarged fragmentary plan view showing details of the jaws constituting the pick-up member and taken along the plane of line 6—6 of FIG. 3, with parts broken away for the sake of clarity;

FIG. 7 is a vertical sectional view through the lift cylinder or elevating means taken along the plane of line 7—7 of FIGURE 2 and showing the mechanism in its lowermost position;

FIGURE 8 is a view similar to FIG. 7 but showing the mechanism in its uppermost position;

FIG. 9 is a horizontal sectional view through the indexing means taken along the plane of line 9—9 of FIG. 7;

FIG. 10 is a vertical sectional view through the vacuum producing means taken along the plane of line 10—10 of FIG. 2;

Briefly described, the invention may be said to include one or more arms having a suitable form of pick-up means thereon. In the form illustrated herein two such arms are shown but it will be evident that the number of arms is immaterial from the standpoint of the novelty being claimed except insofar as it is necessary to transfer an object or workpiece from one station to another.

In the accompanying drawings two arms are shown which are maintained in a rigid relationship with respect to each other. The arms are mounted substantially 90° apart so that when the pick-up device of one arm picks up an object from a first station and transfers it to a second station, the second arm will simultaneously pick up an object from the second station and transfer it to a third station. The main purpose of a second or intermediate station is to provide an idler station so that the work which has been performed on the object at the first station may be inspected or inverted or have a hand operation performed thereon before it is operated upon at the third station.

In this instance the third station is a second stamping or drawing press and it will be evident that if a second operation to be performed on a workpiece is to occur with the workpiece in the same position and immediately subsequent to the first operation, then a single arm could be provided to rotate through 180° and transfer the object from the first press directly to the second.

The transfer mechanism is preferably fluid operated so that the various movements thereof may be performed automatically in a predetermined sequence. For example, if the sequence begins in the position of the arms shown in FIG. 1 in the lowermost position thereof, then the first step will be to move the arms outwardly and to actuate the pick-up device thereon to retain an object therein. The arms are then elevated and rotated or indexed to the next position which in the present case is shown as substantially 90°. The arms are then caused to be lowered, whereupon the pick-up devices will release the objects therein and the arms are moved inwardly and then again indexed back to the original position thereof.

Figure 1:
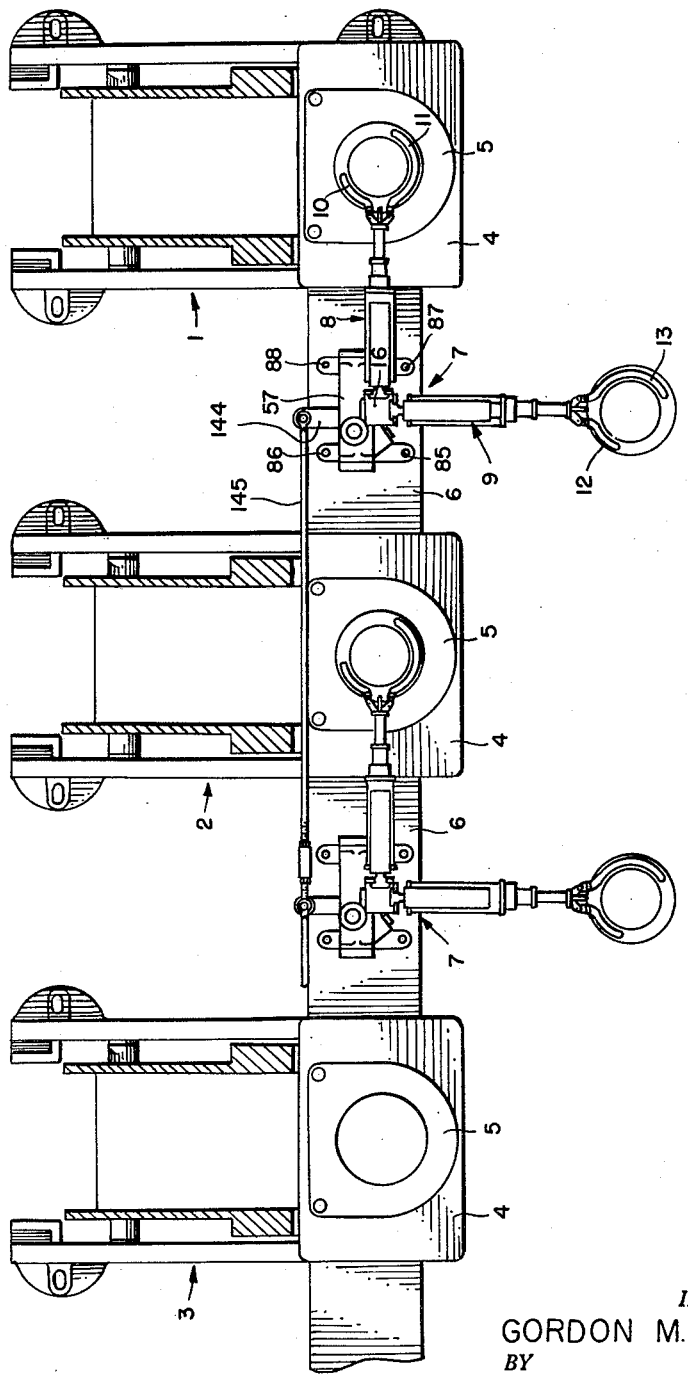

Referring now more particularly to the drawings and especially to FIG. 1, there is illustrated a line of metal working presses indicated generally by the numerals 1, 2 and 3. In the present instance these presses are illustrated as the well known gap frame type which are capable of having the beds 4 thereof inclined if so desired. Each bed 4 is adapted to have a die 5 supported thereon.

Suitable support means 6 extend between the beds of adjacent presses and are adapted to be inclined with the beds. The transfer mechanism generally indicated by the numeral 7 is mounted on the support means 6 so that if the press is to be used in an inclined position, the arms and pick-up devices thereon will move parallel with the beds at all times.

In FIG. 1 there are shown two transfer mechanisms embodying the present invention although there may be as many or as few such devices as desired, depending upon the number of operations to be performed upon any given workpiece. Each of the transfer mechanisms 7 comprises one or more arms such as those indicated generally at 8 and 9 which operate simultaneously to transfer the objects or workpieces to successive stations. A plurality of the transfer mechanisms may be connected together in tandem so that when one is indexed they will all index simultaneously.

The pick-up device mounted on each of the arms may be of any suitable or desired character. For example, such a device may consist of the jaws 10 and 11 as shown on arm 8, and jaws 12 and 13 as shown on arm 9. If, however, the nature of the object on which an operation has been performed is such that it cannot be grasped by jaws such as these, then other specific types of pick-up devices may be used, such as for example the vacuum type shown in FIGS. 11 and 12, or a magnetic type if the object worked upon is of metal and can be subjected to magnetic forces.

The arm and pick-up device

Reference will now be made more particularly to FIGS. 2 to 6 inclusive, and especially to FIGS. 4 and 5 which illustrate a more detailed construction of the arms and the pick-up devices thereon. When a plurality of arms are utilized, they will have identical constructions and a description of one, therefore, will suffice for all.

The arm consists essentially of a supporting framework including a plurality of supporting rods 14 secured at their inner ends to a plate 15 suitably mounted on a block 16. This block 16 is mounted by means of a bolt 17 onto the lift rod 18 (FIGS. 7 and 8) of the elevating means.

The arm itself consists of an outer tubular housing 19 rigidly supported by an annular ring member 20 and a suitable clamping member 21 secured to the outer ends of the supporting rods 14. The clamping means 21 may be loosened to permit longitudinal adjustment of the cylinder or housing 19 to vary the length of the arm to suit specific purposes.

A cap 22 threadedly engages the outer end of the cylinder 19 and has suitable sealing means 23 applied thereto. The inner end of the cylinder 19 is closed by a similar cap 24 having the sealing means 25 thereon and this cap is adapted to support an extension 26 on the inner end of the cylinder 19.

A piston in the form of an elongated tubular member or sleeve 27 is slidable longitudinally within the cylinder 19 and is supported by the end caps 22 and 24. Sealing rings 28 surround an enlarged portion of the piston sleeve 27 and sealingly engage the inner surface of the cylinder 19.

An elongated rod 29 is mounted for sliding movement within the piston or sleeve 27 and is arranged to move both with said piston and with respect thereto. The outer end of the piston or sleeve 27 is threaded to receive a disc 30 thereon. A pair of upper and lower spaced apart threaded studs 31 are fixed to the disc 30. The outer end of each stud 31 has threaded thereon a pair of lock nuts 32. This assembly of disc 30, studs 31, and lock nuts 32 will thereupon have a sliding movement with the tubular piston 27.

The outer end of rod 29 is formed for a short distance of a smaller diameter, as at 33, and is then threaded to receive a plate 34. The plate 34 is provided with a pair of openings to receive freely the studs 31 so that when the sleeve or tubular piston 27 is moved inwardly at the beginning of its stroke or is moved outwardly at the end of its stroke, the studs 31 will move for a short distance independently of the plate 34 and rod 29 to which it is attached.

The outer end of the tubular piston 27 has a longitudinal bore 35 therein providing a shoulder 36 at the inner end thereof. If desired, a ring 37 may be applied to the rod 29 to bear against the shoulder 36, thereby to provide an abutment for the coil compression spring 38 to bear against at one end, the other end of said spring bearing against the inner face of plate 34.

At this point it will be evident that from the position of the parts shown in FIG. 4 the tubular piston 27 may be caused to move inwardly and carry with it the disc 30, studs 31, and lock nuts 32. This initial movement will take place until the lock nuts 32 come against the plate 34 in the position shown in FIG. 5. During this initial movement the rod 29 and parts associated therewith will remain stationary. Beyond this point, however, continued inward movement of tubular piston 27 will thereafter carry with it plate 34 and rod 29 connected therewith. Likewise on return outward movement of the piston assembly, including the sleeve 27 and rod 29, they will move outwardly together to the outermost position of rod 29, as shown in FIG. 5, whereupon the rod will remain stationary while the sleeve 27 and its associated parts continue to move outwardly to the position shown in FIG. 4. The purpose of this initial and final movement of the sleeve or tubular piston member 27 without movement of the rod 29 is to operate the jaws 10 and 11 to open and closed positions. The structure accomplishing this result is more clearly illustrated in FIG. 6 to which reference will now be made.

The disc 30 is preferably rectangular in configuration and has extending outwardly at each side thereof a pair of ears. The upper ear at each side is designated by the numeral 39 and the lower ear which is spaced downwardly therefrom also at each side is indicated by the numeral 40. In FIG. 6 the lower portion of the structure is shown partly in section and with other parts broken away so that the connection between the piston assembly and jaws may be clarified. Each jaw 10 and 11 has a tailpiece 41 which extends inwardly and angularly between the upper and lower ears 39 and 40. Each jaw and its integral tailpiece is pivotally mounted on the ears by means of a vertically extending pivot pin 42. Each tailpiece 41 is bifurcated to receive between the sides thereof an arm 43 extending outwardly from each side of the plate 34. A second pin 44 passes through and connects each arm 43 with its associated tailpiece 41 but the pins 44 do not extend through the ears 39 and 40. Each arm 43 also has an elongated slot 45 through which the pin 44 extends and which the pin 44 traverses during the opening and closing movement of the jaws 10 and 11.

The piston assembly consisting of the sleeve 27 and rod 29 is caused to reciprocate inwardly and outwardly within the cylindrical member 19 preferably by means of fluid pressure. To move the piston assembly inwardly, fluid, such as air under pressure, is admitted to the space 46 within the cylinder 19 and outwardly of the sealing rings 28. When the piston assembly has reached its innermost position, the fluid line in the annular space 46 is exhausted to the atmosphere and fluid under pressure is then directed inwardly of the sealing rings 28 into the annular space 47, thereupon forcing the piston assembly outwardly.

When fluid is admitted initially to the space 46 to cause the piston assembly to move inwardly, only the sleeve 27 and its associated disc 30, studs 31, and lock nuts 32, will move therewith from the position shown in FIG. 4 to that shown in FIG. 5. Referring again to FIG. 6, during this initial inward movement of the piston assembly, the plate 34 and its outwardly extending arms 43 will remain stationary. However, disc 30 and the ears 39 and 40, together with the pivot pins 42 and jaws 10 and 11, will be moved inwardly and the pins 44 will traverse their respective slots 45, thereby causing the jaws 10 and 11 to move outwardly to open position. The entire assembly then will continue its inward movement until fluid pressure is admitted to the annular space 47, whereupon the piston assembly and its associated parts will move outwardly. When the rod 29 reaches its outermost limit, the sleeve 27 will continue to move outwardly causing the pins 44 to traverse the slots 45 in the opposite direction and the reverse movement will then take place to move the jaws 10 and 11 to closed position.

The inner end of rod 29 is formed of a smaller diameter for a short distance, as at 48, and is threaded to receive a nut 49 which holds a supporting plate 50 on the end of the rod which has guide openings therethrough to receive the guide rods 51 which are mounted upon the inner cap 24. These guide rods 51 thus aid in guiding the piston assembly in its reciprocating movement.

Each of the arms 8 and 9 has mounted thereon a mechanically actuated three-way valve 52 and a second mechanically actuated three-way valve 53 spaced inwardly therefrom. An arm 54 movable with the piston assembly is adapted to actuate the three-way valve 52 when the piston assembly is moved to its outermost position and to actuate the valve 53 when moved to its innermost position. As will be described more fully hereinafter, the operation of valves 52 will actuate the lift cylinder for operating the elevating means and actuation of valves 53 will direct fluid under pressure for operation of the indexing means.

*The elevating means*

The elevating means and the indexing means are contained in an integral unitary casting member generally indicated by the numeral 55 in FIGS. 7, 8 and 9. This casting is formed to provide a vertically extending lift cylinder 56 and a horizontally positioned indexing cylinder 57.

A piston 58 is located within the lift cylinder 56 near the bottom thereof and is adapted to slide therein. A sealing ring 59 may be provided in a suitable annular recess in the piston 58.

The rod 18 which has the mounting block 16 for the arms secured thereto extends downwardly through the lift cylinder 56 and terminates at its lower end within a recess or bore 60 in the piston 58. The lower end of the rod 18 is formed of a smaller diameter, as shown at 61, to accommodate an inner bearing race 62 thereon. An outer bearing race 63 fits within the bore of the piston 58, thereby allowing the rod 18 and the members mounted thereon free rotation with respect to the piston 58.

A nut 64 is applied to the lower end of rod 18 to clamp the inner bearing race 62 in position thereon. A ring 65 is applied to the upper end of piston 58 and extends over the outer bearing race 63 and is secured to the piston by screws 66 so that the inner and outer bearing races are securely locked in position against axial movement.

The lower end of piston 58 has an extension 67 thereon and is received within a recess or bore of a bottom cap member 68. This cap member is secured to the lower end of the lift cylinder 56 by means of the screws or bolts 69.

A threaded rod or bolt 70 passes upwardly through the cap 68 and threadedly engages the extension 67 of piston 58. The lower end of the bolt 70 has applied thereto the lock nuts 71 to lock securely in place a plate having a finger 72 extending outwardly at one side thereof. The finger 72 extends through a slot 73 in a plate 74 mounted at one side of the main casting 55.

The rod 18, piston 58, bolt 70, and finger 72 are all maintained normally in the lowermost position thereof by means of a coiled compression spring 75 which surrounds the bolt 70. One end thereof bears against the plate from which the finger 72 extends and the other end bears upwardly against the cap 68. Thus, when the elevating means consisting of the rod 18 and piston 58 is caused to move upwardly under fluid pressure, it will carry with it the bolt 70 and finger 72 to compress the spring 75. When the fluid pressure is released, the spring 75 will move the parts back to their normal lower position.

The plate 74 has the mechanically operated three-way valves 76 and 77 mounted thereon in a position to be in the path of movement of the finger 72. Thus, when fluid under pressure is admitted to the cavity 77a between the lower end of piston 58 and cap 68, movement of the piston and rod 18 will occur in an upward direction carrying with it the finger 72 so that when it reaches its uppermost position, the finger will actuate the three-way valve 77, thereupon directing fluid to the indexing cylinder for causing rotation of rod 18 and the arms 8 and 9 mounted thereon.

As will become more apparent when reference to the fluid diagram is made, the indexing of the arms to the second and third stations, respectively will release the fluid pressure, thereby permitting the spring 75 to return the elevating mechanism to its lowermost position. When this occurs, the finger 72 will operate three-way valve 76 for directing fluid into the forward ends of the arms 8 and 9 for retracting them or moving them inwardly and returning them back to their original position. Reference to FIGS. 7 and 8 will clarify the relative lower and uppermost positions of the elevating means respectively,

The indexing means

Again referring to FIGS. 7, 8 and 9, it will be noted that the rod 18 has an enlarged portion 78 intermediate the ends thereof, which is provided around a portion of its periphery with a plurality of elongated teeth 79. The opposite side of the portion 78 is provided with a radially extending block 80 secured thereto by means of the screws 81. This block rotates with the rod 18 and extends through a circumferential slot 82 in the lift cylinder 56.

The rod 18 with the arms 8 and 9 mounted thereon, is caused to move throughout an arc of substantially 90°. The precise location of the arms at each position thereof may be determined and limited by adjustable set screws 83 and 84 threadedly received in suitable openings in the casting 55, as may be more clearly seen in FIG. 9. The entire casting and the parts assembled therewith are mounted upon the support 6 extending between adjacent presses by means of the bolts or tie rods 35, 86, 87, and 88.

The teeth 79 on rod 18 mesh with teeth 89 on a piston 90 reciprocably mounted within the horizontally positioned indexing cylinder 57. The teeth 79 are of sufficient length to remain in mesh with the teeth 89 during the raising and lowering movement of the elevating mechanism. Thus, movement of piston 90 in either direction will cause a rotation of rod 18 and the arms mounted thereon whenever it is reciprocated and regardless of whether the elevating mechanism is in its upper or lower position.

The ends of the indexing cylinder 57 are provided with annular flanges 91 and 92. The ends of the cylinder are then closed by means of the cap members 93 and 94. Each cap member is secured to its associated annular flange by means of screws 95. There are a plurality of such screws 95 and each has associated therewith an adjustable set screw 96. Thus, the distance within the cylinder 57 to which the cap members 93 and 94 will extend will be determined by the position of the set screws 96 at each end thereof.

This is necessary because of the variation in the arc which may be required for the arms to move between stations. Thus, the arms should move throughout an arc of substantially 90°. However, the relative locations of adjacent presses and the idle station therebetween may require a greater or lesser arc. The set screws 83 and 84 and the set screws 96 may all be adjusted to vary the arc through which the arms rotate from approximately 85° to 95°. If the arc is less than 90°, then the set screws 83 and 84 may be moved outwardly to limit the arc of rotation the desired amount. The distance through which the piston 90 will reciprocate must also be less under such circumstances and, therefore, the set screws 96 at one or both ends of cylinder 57 may be moved outwardly to permit the end caps 93 and 94 to extend inwardly of the cylinder a greater distance. This will limit the movement of the piston 90.

Likewise, if the arc is to be made greater, the set screws 83 and 84 may be moved inwardly and the set screws 96 may also be moved inwardly to move the caps 93 and 94 outwardly, thereby allowing the piston 90 to move throughout a greater distance.

Figure 2:
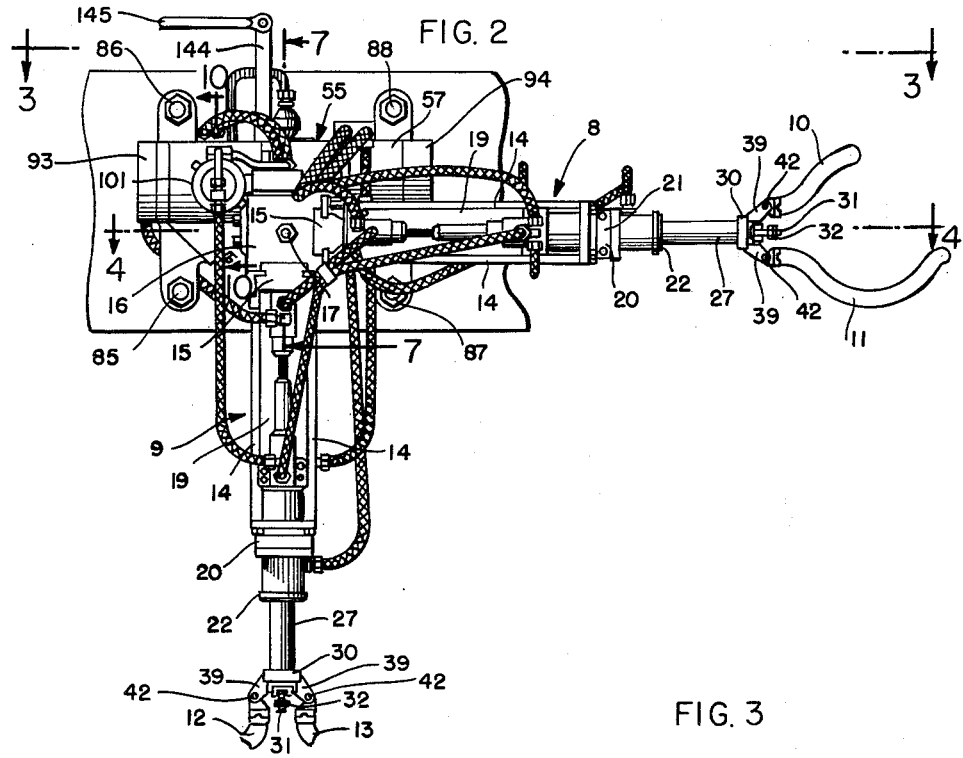
FIG. 2 is a somewhat enlarged plan view of one of the transfer mechanisms embodying the present invention.
Figure 3:
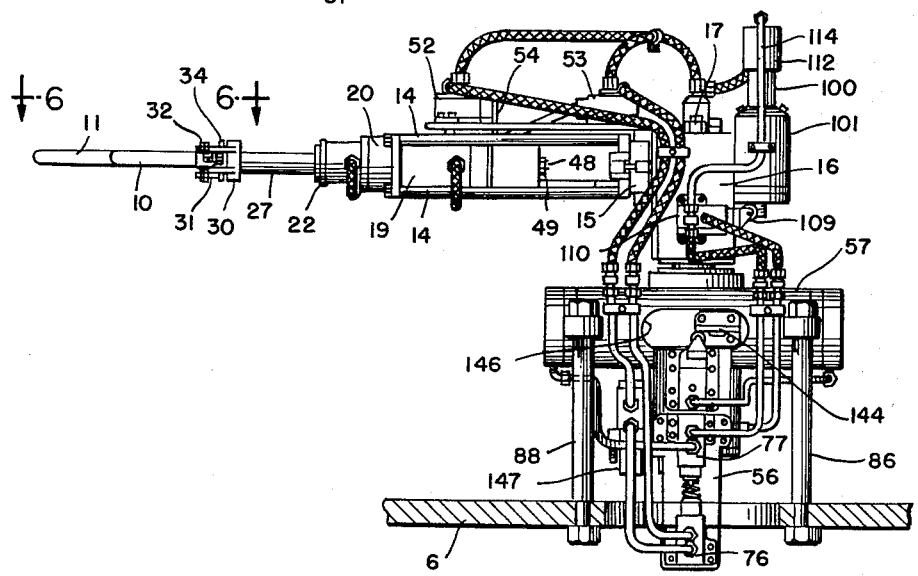
FIG. 3 is a rear elevational view of the mechanism shown in FIG. 2 looking in the direction of the arrows on line 3—3 of FIG. 2.

The caps 93 and 94 both have a plurality of suitably arranged fluid passageways 97 therein for the admission of fluid under pressure to one or the other end of the cylinder 57. FIG. 9 shows the position of the indexing cylinder so that the arms 8 and 9 will be positioned as shown in FIGS. 1, 2 and 3. When the arms are to be rotated through substantially 90°, fluid under pressure will be admitted through the lefthand end cap 93. This will move the piston 90 toward the end cap 94 and will rotate rod 18 and the arms mounted thereon in a clockwise direction. The construction of the end caps 93 and 94 with the fluid passages 97 therein is such that when air is the fluid being used, the rotation will be comparatively rapid until near the end of the movement at which time an air cushion will be formed in the opposite end of the cylinder to slow the movement during the last few degrees.

Thus far the mechanism has been described as though an operation had just been performed on a workpiece and the press slide is moving upwardly at which time the arms have been moved outwardly and the jaws closed on the workpiece. This is the position of the arms in FIGS. 4 and 5. At this point the valves 52 will have been actuated by the arms 54 to direct air or other fluid into the cavity 77a (FIGS. 7 and 8) to operate the elevating means from the position of FIG. 7 to that shown in FIG. 8. The arms and the workpiece held thereby are then in a raised position. At this point finger 72 has actuated valve 77, thereupon directing the air or other fluid under pressure into the passageways 97 in cap member 93 for indexing and rotating the arms to the next successive station.

At this point in the operation, which will be described more fully hereinafter, the air in all of the lines will be open to atmosphere at which time the spring 75 will return the elevating mechanism to its lowermost position, whereupon finger 72 will actuate valve 76 and direct air into the cavity 46 at the forward end of each arm. Since the indexing cylinder and the arms are in a horizontal plane, the opening of the air to the atmosphere will not disturb the position of the pistons therein. Air under pressure into the cavity 46, however, at the forward end of the arms will then cause a retraction or an inward movment of the piston assembly, thereby to open the jaws and release the workpiece therein at the successive stations. As the piston assemblies continue to move inwardly, the arms 54 thereon will eventually operate the three-way valves 53 for directing air or other suitable fluid into the passageways 97 of the end cap 94 which will thereby cause a movement of piston 90 in the opposite direction, or toward the left, as viewed in FIGS. 1 and 2, to rotate the elevating mechanisms and the arms back to the initial position.

The vacuum pickup

As stated previously herein, the pick-up device may vary depending upon the type of workpiece being transferred. The shape of the workpiece may or may not lend itself to being grasped by the jaws on the outer ends of the arms and if not, other pick-up means may be utilized. A suction device or a magnetic device can be utilized in the place of the jaws if desired. For purposes of illustration, there is disclosed in FIGS. 10, 11 and 12 thereof a suitable form of a vacuum pick-up device which may be used if desired without in any way affecting the operation of the remainder of the transfer mechanism.

Referring particular to FIG. 10, the vacuum producing device is indicated generally by the numeral 98 which is mounted on the block 16 by means of a suitable bracket 99 (see also FIGS. 2 and 3) and includes an upper neck portion 100 of relatively small diameter and a lower body portion 101 of relatively larger diameter. A rod 102 is mounted for reciprocation within the device and has a portion thereof extending through the neck 100 and downwardly through the main body 101.

The rod has mounted thereon a piston 103 secured in place intermediate the ends of the rod by means of a nut 104. A sleeve 105 is suitably secured adjacent the lower end of the rod 102 which extends downwardly beyond the end of the main body 101. The lower end of the body has a cap member 106 secured thereto having a central bore 107 therethrough through which the rod 102 and sleeve 105 are adapted to pass during the reciprocating movement thereof. The sleeve 105 has a beveled lower end as indicated at 108 so that as it moves downwardly it will contact an arm 109 of a mechanically actuated valve 110 (FIG. 3) which, as will be seen hereinafter, is adapted to direct air or other fluid under pressure to the lift cylinder when the vacuum pickup is used.

A coiled compression spring 111 is positioned within the body 101 and bears at its lower end against the cap 106 and at its upper end against the piston 103, thereby normally maintaining the piston in its uppermost position.

The upper end of the neck portion 100 is closed by means of a cap 112 which has an opening 113 in the top thereof to which air or other fluid under pressure is directed through the conduit 114 (FIG. 3). The opening 113 communicates with a passage 115 within the cap 112 normally closed by means of a ball check valve 116 through pressure of a spring 117 positioned in a passageway 117a. This latter passageway and the passageway 115 both communicate with a vertical passageway 118 for the direction of air or other fluid under pressure against the upper end of the rod 102.

Thus, when the vacuum pick-up device is used, air or other fluid under pressure may be directed to the vacuum device before reaching the lift cylinder. The fluid under pressure will unseat the ball valve 116, thereby to direct pressure against the rod 102, thereby moving it and the piston 103 downwardly. This movement creates a vacuum which is effective to pick up a workpiece through the openings 119 and 120 in the body portion 101.

Figure 11:
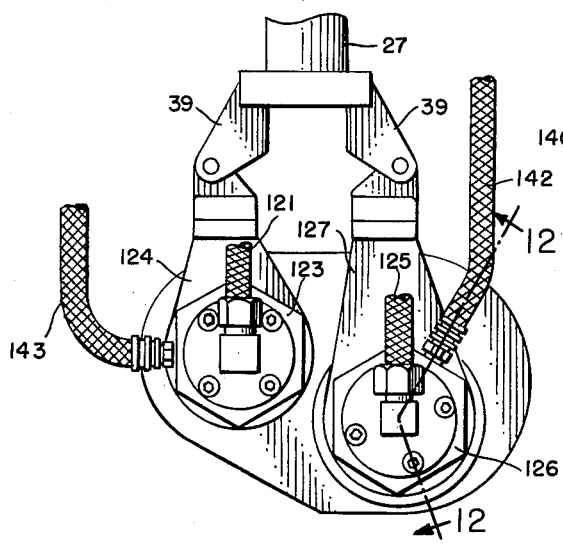
FIG. 11 is a fragmentary plan view of a modified form of pick-up device embodying a vacuum head.
Figure 12:
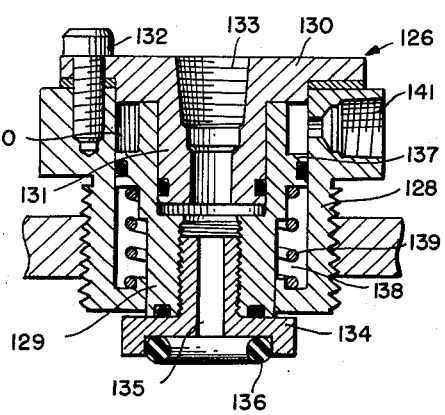
FIG. 12 is a sectional view of the vacuum head taken along the plane of line 12—12 of FIG. 11.

FIG. 11 illustrates a form of vacuum pick-up device consisting of two vacuum heads although the number of such heads is not an important consideration and may be varied to suit particular conditions. A conduit 121 connects one of the openings, such as 119, to one of the vacuum heads 123 mounted on a suitable arm 124. A second conduit 125 may connect the other opening, such as 120, with another vacuum head 126 mounted on an arm 127. If desired, these arms 124 and 127 may be secured to the mounting brackets 39 on the tubular piston 27 of each arm in a manner similar to the heretofore described jaws, or they may be mounted on such arms in any other suitable way.

The construction of the vacuum heads are identical so that a description of one will suffice for both. In this connection reference is made to FIG. 12 wherein it will be seen that the vacuum head consists essentially of a main body or cylinder 128. A reciprocable piston member 129 is mounted within the cylinder 128 and the upper end of the cylinder is then closed by means of a cap 130. This cap has a centrally disposed extension 131 extending downwardly into the piston 129 and is secured to the cylinder 128 by suitable means, such as the bolts 132. A central bore 133 extends through the cap 130 and the extension 131 thereof. A flanged tubular member 134 is threadedly received within a threaded opening through the bottom of the piston 129 and has a bore 135 therethrough in communication with the bore 133 of the cap member. An annular recess in the lower end of member 134 receives a ring 136 formed of rubber or other suitable resilient material so that it may be easily adapted to retain a workpiece when a vacuum is applied thereto.

The piston 129 has an annular rib 137 thereon intermediate its ends which is in sealing contact with the inner surface of the cylinder 128. An annular space 138 is provided between the piston 129 and cylinder 128 below the annular rib 137 to receive a coiled spring 139. It will be noted that this spring bears at one end against the lower end of the cylinder and at its other end upwardly against the rib 137 on piston 129, thereby normally maintaining it in its uppermost position.

Another annular recess or cavity 140 is formed above the rib 137 and between the piston and cylinder adapted to receive air or other fluid under pressure through an opening 141 through one side of the cylinder 128. A conduit 142 is connected between the opening 141 and the opening 117a on the vacuum device. A second conduit 143 is connected to the other vacuum head in the same manner and also joins in connecting at its other end with the opening 117a.

It will thereupon be apparent that when air or other fluid under pressure enters the opening 113 in the vacuum device and unseats the valve 116, thereby forcing the piston 103 downwardly to create a vacuum, such pressure will continue to act until the piston 103 reaches its lowermost position. Also during this time a vacuum will be created through the passage 133 in each vacuum head to which the conduits 121 and 125 are connected respectively, so that when a workpiece comes into contact with the annular ring 136 on each vacuum head it will be held in position thereagainst. When the piston 103 reaches its lowermost position and fluid under pressure still continues to flow through passage 115, it will then be diverted through the opening 117a and to the conduits 142 and 143 for moving the piston 129 of each vacuum head downwardly in contact with the workpiece.

When the air under pressure in the entire system is opened to the atmosphere, valve 116 will be closed by pressure of the spring 117 and piston 103 will be elevated back to its normal position by reason of the pressure exerted by the coiled spring 111. Likewise the spring 139 in each of the vacuum heads will return piston 129 back to its normal uppermost position in readiness for its next cycling of the transfer mechanism.

When there are more than one transfer mechanisms, all of which are to be operated simultaneously in tandem, it is advisable to have suitable connections between all of the mechanisms to insure their simultaneous operation. For this purpose an arm 144 (FIGS. 1, 7, 8, and 9) may be mounted on each indexing cylinder 90 and have connected between adjacent such arms a link 145. Each arm 144 may extend rearwardly of the transfer mechanism through a slot 146 in the cylinder 57 to permit a back-and-forth movement of the arm and its associated link.

*Operation*

Figure 13:
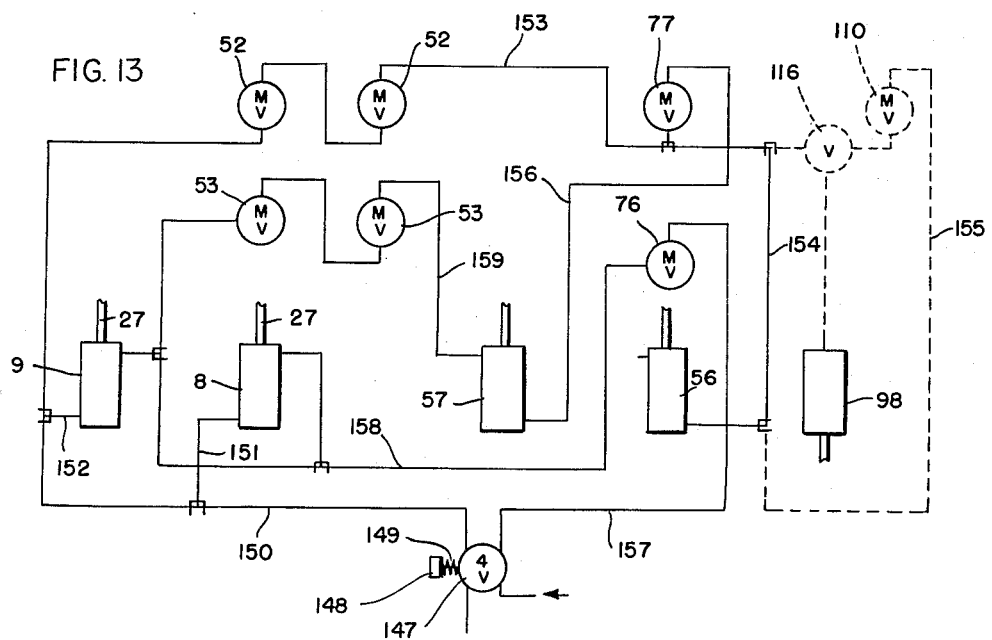
FIG. 13 is a schematic diagram illustrating the fluid conduit connections for operating the various parts of the transfer mechanism.

Having explained above the operation of each of the component parts of the device by reference to the various figures of the drawings illustrating the mechanical construction of these parts, it is thought that the sequence of operations may best be understood by referring to the schematic diagram of FIG. 13. In describing the sequence of operations, it will be evident that other fluids than air can be used if desired.

The operation of the device is controlled by a main four-way valve 147 (see also FIG. 3). The valve is operated by a solenoid 148 which, when energized, will operate the valve 147 to direct air into the main line to begin the transfer cycle. When the solenoid 148 is de-energized, a spring 149 will return the valve back to its normal position to direct air to the opposite side for the return cycle.

In describing the sequence of operations, it will be assumed that the arms are in their positions as shown in FIG. 1 but in a retracted position with the jaws 10 and 11 open. If the pick-up device is vacuum operated, as above explained, then the piston 103 in the vacuum device will be in its uppermost position as shown in FIG. 10.

A blank workpiece will have been placed in the first press and the drawing operation thereof will have been completed. As the slide of the press moves upwardly to its uppermost position, it will operate a suitably located limit switch (not shown) which will energize the solenoid 148 to shift the valve 147 and direct air under pressure into the main line 150.

When this occurs, air will pass through the conduits 151 and 152 to the arms 8 and 9 behind the pistons therein to move the rods 27 outwardly. As these arms move outwardly, the jaws 10 and 11 of arm 8 will close upon the workpiece just formed. At the same time the jaws 12 and 13 on arm 9 will close upon a workpiece which has previously had the first operation performed thereon and has been either inspected or turned over or some hand operation performed thereon at the idle station. At the same time the outward movement of the piston 27 on both arms will mechanically actuate the valves 52 thereon to open position permitting the air under pressure to pass through those valves to the conduit 153 and either to the lift cylinder or to the vacuum pump. If a vacuum pickup is not used, then the air may be carried directly to the lift cylinder 56 through line 154. If, however, the vacuum pickup is utilized, the air will be directed into the vacuum pump to unseat the check valve 116, whereupon the piston in vacuum pump 98 will be moved downwardly creating a suction in the pick-up device and at the same time opening mechanical valve 110. With this latter valve open, the air will then pass through line 155 to the lift cylinder 56.

Movement upward of the lift cylinder actuates mechanical valve 77, whereupon the air is then directed through line 156 to the indexing cylinder 57. As explained above, movement of the indexing cylinder will rotate the arms 8 and 9 so that the pick-up device on arm 9 will transfer the workpiece from the idle station to the next press while arm 8 will transfer simultaneously the workpiece from the first press to the idle station.

Upon completion of the indexing step, a suitably positioned limit switch (not shown) will de-energize the solenoid 148, whereupon the spring 149 will move the solenoid to operate valve 147 so that it will first pass through a position to open line 150 to atmosphere, and then to the opposite position thereof to direct air through line 157. Since the pistons in all of the arms and indexing cylinder are movable in a horizontal plane, they will not change position when the conduits are open to atmosphere. The pistons in the lift cylinder 56 and vacuum pump 98, however, are movable vertically so that when the air lines connected thereto are open to atmosphere, the springs therein will move the piston in the lift cylinder downwardly and the piston in the vacuum pump upwardly. Thus, if a vacuum pickup is used, the suction will be broken by this movement and the workpiece will be dropped therefrom at the time the arms move downwardly. If the jaws are utilized as the pick-up device, they will move downwardly with the arms and will retain the workpieces therein until the arms are retracted.

The opening of the air lines to atmosphere is a momentary occurrence, while the valve 147 is moved from one position thereof to the other extreme position, allowing the air under pressure to flow through the conduit 157.

As the piston in the lift cylinder 56 moves downwardly, valve 76 will be mechanically actuated so that air from line 157 will pass therethrough and be directed through line 158 to the outer ends of the arms 8 and 9. This will then cause a retraction of the pistons therein and will open the jaws thereon to release the workpiece therefrom.

As the pistons in the arms move inwardly, valves 53 thereon will be mechanically actuated, whereupon the air under pressure through line 158 will continue through the valves 153 and through the conduit 159 to the opposite side of the piston in the indexing cylinder 57. With the arms thus retracted, the piston in the indexing cylinder will cause their rotation back to the original starting position as shown in FIG. 1, but with the arms retracted and the jaws open.

The mechanism is then in position for the cycle to be repeated since a stamping operation of the next succeeding workpiece will have been performed thereon while the arms were being returned to their starting position. After the workpiece has been stamped and the press slide is returned upwardly to its original starting position, it operates a limit switch which again energizes the solenoid 148 of valve 147 and the foregoing cycle is repeated.

From the foregoing description it will be evident that a novel form of a transfer mechanism has been designed for automatic transferring of workpieces to successive stations where a plurality of successive steps are to be performed thereon. The present construction of the various parts disclosed herein has numerous advantages. As an example of some of these advantages, it may be noted that the length of the arms can be adjusted by loosening the clamp 21 (FIG. 4) and moving the entire cylinder assembly inwardly or outwardly. Also, by making the supporting rods longer, they can accommodate longer arms if necessary.

Furthermore, the height of each arm can be individually adjusted by regulating the position of the arms on the gibs of the main mounting block 16.

The indexing movement of the arms can also be regulated by adjustment of the set screws 83 and 84 (FIG. 9) and the movement of the indexing cylinder 90 can be regulated as hereinabove described to accommodate the adjustment of the set screws. Likewise, the amount that the jaws are to be opened can be regulated to the size of the particular stamping being run through the press line.

Since the operation of the transfer mechanism is controlled in its initial movement by operation of the press slide, it will be apparent that it is synchronized therewith to operate in timed relation with respect to the stamping operation of all of the presses in the line.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. Mechanism for transferring an object between work stations for the performance of successive operations thereon, comprising fluid operated elevating means including an upright rotatable and vertically movable shaft having a piston on the lower end thereof for movement upwardly and downwardly in response to increase and decrease of fluid pressure on said piston, said shaft having teeth spaced around a portion of the periphery thereof, an arm rotatably mounted at one end portion on said elevating means for rotation therearound, means for longitudinally reciprocating said arm outwardly to pick-up position and inwardly to idle position, pick-up means on said arm adapted to pick up and retain an object thereon, means operable in response to outward movement of said arm to actuate said pick-up means to pick up an object and to actuate said fluid operated elevating means to elevate said arm to an upper position, means operable in response to the upward movement of said arm to rotatingly index said arm to a successive station, said last mentioned means including an elongated cylinder disposed substantially perpendicular to said shaft, and an elongated piston disposed longitudinally in said cylinder and having a rack extending longitudinally thereof in meshed engagement with said teeth on said shaft, said piston being reciprocable by fluid pressure in said cylinder to thereby rotate said shaft, and means operable in response to the indexing movement of said arm to actuate said fluid operated elevating means to move said arm to the lowermost position thereof and to actuate said pick-up means to release an object therefrom.

2. Mechanism as defined in claim 1, and in which said pick-up means includes a pair of jaws on said arm movable to open and closed positions for releasing or retaining an object therein respectively, and means operable in response to outward movement of said arm to close said jaws and operable in response to inward movement of said arm to open said jaws.

3. Mechanism as defined in claim 1, and in which said pick-up means includes a vacuum head on said arm adapted to retain an object thereon and to release an object therefrom, and means operable in response to said outward and inward movement of said arm to create a vacuum in said head for retention of an object thereon and to release the vacuum in said head to release the object therefrom, respectively.

References Cited in the file of this patent

UNITED STATES PATENTS

| | | |
|---|---|---|
| 925,968 | Webb | June 22, 1909 |
| 1,211,611 | Meyer et al. | Jan. 9, 1917 |
| 1,836,444 | Carnahan | Dec. 15, 1931 |
| 2,247,787 | Schmidt | July 1, 1941 |
| 2,268,075 | Langer | Dec. 30, 1941 |
| 2,541,574 | Crooks | Feb. 13, 1951 |
| 2,609,776 | Sahlin | Sept. 9, 1952 |
| 2,692,693 | Newburg | Oct. 26, 1954 |
| 2,725,154 | Hendricks | Nov. 29, 1955 |